Patented Apr. 6, 1948

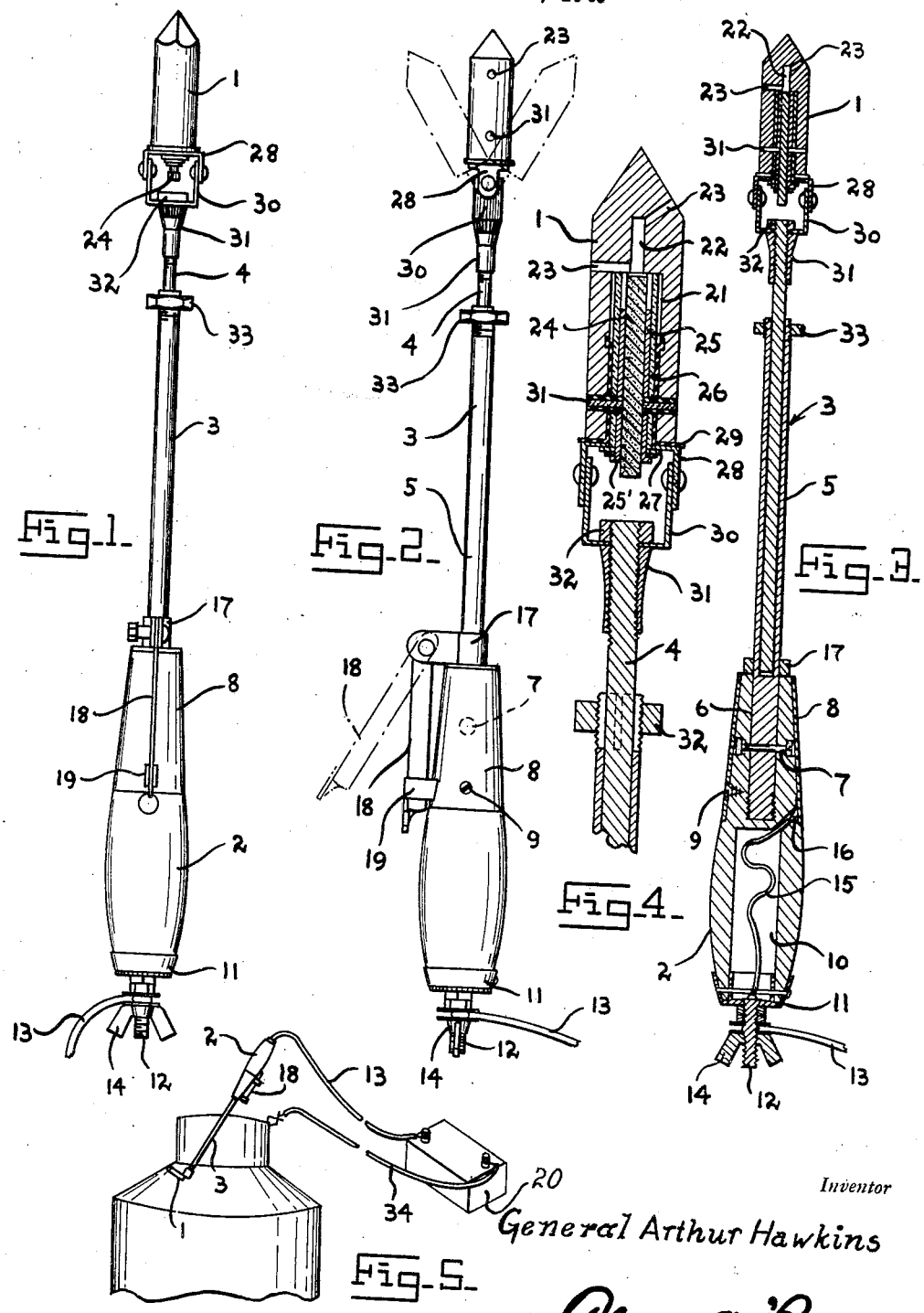

2,439,296

UNITED STATES PATENT OFFICE 2,439,296

ELECTRIC SOLDERING IRON

General Arthur Hawkins, Dallas, Tex.

Application October 1, 1945, Serial No. 619,476

1 Claim. (Cl. 219—26)

This invention relates to a soldering iron and it is one object of the invention to provide a soldering iron which is heated by electricity and of such construction that a low voltage battery may be used for supplying electrical energy to the soldering iron. It will thus be seen that the soldering iron may be connected with a battery of an airplane, automobile, or the like, and emergency repairs made.

Another object of the invention is to provide a soldering iron wherein the copper tip of the soldering iron is so mounted that it may be swung to angularly adjusted position and allow soldering to be performed at places which could not be reached with a soldering iron which is straight throughout its length.

Another object of the invention is to provide a soldering iron wherein the shank thereof consists of telescoping member so that the soldering iron may be stored in a small tool box or other receptacle when not in use and lengthened when in use in order to allow soldering to be carried out at places which could not be reached with a short soldering iron.

Another object of the invention is to provide the soldering iron with a handle having associated therewith a switch by means of which flow of current may be controlled and unnecessary drain upon a battery thus avoided.

Another object of the invention is to provide improved means for heating the copper head at the front end of the soldering iron.

The invention is illustrated in the accompanying drawings, wherein—

Figure 1 is a side elevation of the improved soldering iron,

Figure 2 is a view looking from one side of Figure 1 and showing the copper tip or head of the soldering iron extending longitudinally thereof in full lines and shown swung to angularly adjusted positions by dotted lines.

Figure 3 is a sectional view taken longitudinally through the soldering iron,

Figure 4 is a sectional view upon an enlarged scale taken longitudinally through the copper head or tip of the soldering iron and the forward portion of its shank, and Figure 5 is a perspective view showing the improved soldering iron in use.

This improved soldering iron has a head or tip 1 formed of copper, a handle 2 formed of wood or other suitable insulating material, and a shank 3 having front and rear sections 4 and 5. The rear section 5 of the shank is of tubular formation for the major portion of its length, but has its rear end portion solid, as shown in Figure 3, in order that when this rear end portion is thrust into the socket 6 of the handle 2, it may be firmly secured by a bolt 7 which passes transversely through the handle and the shank and has its head and its nut countersunk in the handle to prevent contact thereof with a sleeve or ferrule 8 which fits tightly about the tapered forward portion of the handle and is secured thereon by a screw 9. A pocket 10 is formed in the handle with its open end at the rear end of the handle and this open end of the pocket is normally closed by a removable cap 11 carrying an outwardly projecting post which is threaded in order that a conductor wire 13 may be secured to the post by a winged nut 14. A wire 15 extends longitudinally through the pocket 10 and has its inner or forward end portion passed outwardly through an opening 16 so that this protruding end of the lead wire 15 may have engagement with the sleeve 8 when the sleeve is applied to the handle. A clamp 17 is tightly secured about the rear section 5 of the shank and this clamp carries a switch blade 18 which is mounted for pivotal movement in order that it may be swung from the closed position in which it engages between the switch blades 19 of the ferrule to the open position indicated by dotted lines in Figure 2. By providing the soldering iron with a switch mounted near the front end of its handle, flow of current from the battery 20 may be readily controlled by opening or closing the switch, and it should also be noted that due to the location of the switch, the handle may be grasped in the usual manner and the soldering iron used without inconvenience due to presence of the switch.

The copper head or tip 1 is formed with a longitudinally extending pocket 21 leading from its rear end and having an extension 22 of reduced diameter leading from its front end and provided with glow ports 23. A rod 24 formed of carbon extends longitudinally in the pocket 21 with its inner or front end making contact with the inner end of the pocket. This carbon rod fits sungly within a metal sleeve 25 which, in its turn, fits within a sleeve 26 formed of isinglass. At its outer end, the metal sleeve is formed with an annular flange 25' which bears against a metal washer 27. The metal washer 27 contacts a second metal washer 27' which in turn has contacting engagement with a hinge yoke 28 which fits about the sleeve 25 to complete the electric circuit to the head or tip 1. It will thus be seen that when the soldering iron is in use, current flowing through the shank and through the hinge yoke 30 at the front end of the shank to the hinge yoke 29 which is pivoted thereto may flow to the carbon rod and cause the copper soldering head 1 to be heated. Pins 31 formed of clay serve to firmly hold the sleeves in place within the pocket 21, since these pins will be baked by the heat and prevent the sleeves from slipping out of place. The hinge yoke 30 has a hub threaded about the front end of the forward section or rod 4 of the shank and is firmly clamped to said yoke by a nut 32. The front end portion of the tubular rear section 5 of the shank is split longitudinally and externally threaded to receive a nut 33 so that when the rod 4 is slid forwardly to an extended position, the nut may be tightened to contract the forward end portion of tube 5 about the rod 4 and firmly secure the shank in its longitudinally adjusted position.

When this improved soldering iron is in use, the conductor wire 13 is connected with a terminal post of the low voltage, high amperage battery 20, a second conductor wire 34 is connected with the other post of the battery and carries, at its outer end, a clip 35 which is applied to the metal article to be soldered. The soldering iron is grasped by its handle 2 and the switch 18 moved to its closed position. The copper head or tip 1 may then be disposed against the metal article to be soldered and a circuit will be completed so that current will flow through the carbon rod and heat the soldering head. When it is found that the soldering head is of a sufficiently high temperature, the switch 18 may be opened and thus shut off flow of current through the carbon rod. Extra carbon rods may be stored in the pocket 10 of the handle. Since the copper head or tip is pivotally mounted for swinging movement transversely of the rod 4, it may be moved to angularly adjusted position and allow its front end to be engaged with portions of a metal article which could not be conveniently reached with a soldering iron straight throughout its length. This also permits the copper head to be swung transversely of the shank to a position which will allow a carbon rod to be removed when consumed, and a new one applied.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

What is claimed is:

In combination, a soldering tool including a copper soldering head having a pointed tip and formed with a longitudinal pocket being reduced at its front end, with glow ports extending from said pocket through the side and tip of said head, a mica insulating sleeve in said pocket, a metal sleeve having an annular flange on its lower end disposed in said mica sleeve, a carbon rod in said metal sleeve contacting the soldering head at its front end, a metal hinge yoke, superimposed metal washers disposed about said metal sleeve respectively contacting said annular flange and said metal hinge yoke, opposed clamp pins extending inwardly through said sleeves for holding the same in position, a mica insulating washer between said soldering head and said yoke, a second yoke pivoted to said first yoke, a handle, a conducting shank between said second yoke and handle, a conductor connected to said conducting shank connectible with a suitable source of electric current supply, and the tip of said soldering head, when contacting its work, serving to close the circuit with said source of electric current supply to heat said carbon rod and said soldering head.

GENERAL ARTHUR HAWKINS.

REFERENCES CITED

The following references are of record in the file of this patent:

UNITED STATES PATENTS

| Number | Name | Date |
|---|---|---|
| 1,491,389 | Frykman | July 11, 1921 |
| 1,571,836 | Hockersmith et al. | May 14, 1924 |
| 1,826,933 | Hazlett et al. | Mar. 12, 1930 |
| 1,928,522 | Amundsen | Sept. 15, 1932 |
| 1,880,940 | Ennigna | Oct. 4, 1932 |
| 2,056,951 | Bohall et al. | Sept. 5, 1933 |
| 2,036,169 | Beleson | Aug. 1, 1934 |